(12) United States Patent
Abbott et al.

(10) Patent No.: US 7,085,800 B2
(45) Date of Patent: Aug. 1, 2006

(54) COMPREHENSIVE SYSTEM, PROCESS AND ARTICLE OF MANUFACTURE TO FACILITATE INSTITUTIONAL, REGULATORY AND INDIVIDUAL CONTINUING EDUCATION REQUIREMENTS VIA A COMMUNICATIONS NETWORK

(75) Inventors: Annette M. Abbott, 6317 S. Ash Ave., Broken Arrow, OK (US) 74011; Jack E. Brown, Jr., Tulsa, OK (US)

(73) Assignee: Annette M. Abbott, Tulsa, OK (US)

( * ) Notice: Subject to any disclaimer, the term of this patent is extended or adjusted under 35 U.S.C. 154(b) by 491 days.

(21) Appl. No.: 09/871,348

(22) Filed: May 30, 2001

(65) Prior Publication Data

US 2002/0032576 A1   Mar. 14, 2002

Related U.S. Application Data

(60) Provisional application No. 60/208,721, filed on Jun. 1, 2000.

(51) Int. Cl.
*G06F 15/16* (2006.01)

(52) U.S. Cl. ............... 709/200; 709/217; 709/223; 707/6; 434/319; 434/322; 434/350

(58) Field of Classification Search ............. 709/200, 709/217, 223; 707/6; 434/350
See application file for complete search history.

(56) References Cited

U.S. PATENT DOCUMENTS

| | | | | |
|---|---|---|---|---|
| 4,798,543 A | * | 1/1989 | Spiece | 434/323 |
| 5,341,474 A | * | 8/1994 | Gelman et al. | 725/94 |
| 5,423,003 A | * | 6/1995 | Berteau | 370/254 |
| 5,454,722 A | * | 10/1995 | Holland et al. | 434/271 |
| 5,581,479 A | * | 12/1996 | McLaughlin et al. | 725/145 |
| 5,584,025 A | * | 12/1996 | Keithley et al. | 707/104.1 |
| 5,590,057 A | * | 12/1996 | Fletcher et al. | 702/182 |
| 5,788,508 A | * | 8/1998 | Lee et al. | 434/350 |
| 5,823,789 A | * | 10/1998 | Jay et al. | 434/365 |
| 5,884,325 A | * | 3/1999 | Bauer et al. | 707/201 |
| 5,930,474 A | * | 7/1999 | Dunworth et al. | 709/217 |
| 5,947,747 A | * | 9/1999 | Walker et al. | 434/354 |
| 6,018,730 A | * | 1/2000 | Nichols et al. | 706/45 |
| 6,039,575 A | * | 3/2000 | L'Allier et al. | 434/323 |
| 6,157,808 A | * | 12/2000 | Hollingsworth | 434/350 |
| 6,162,060 A | * | 12/2000 | Richard et al. | 434/118 |
| 6,170,014 B1 | * | 1/2001 | Darago et al. | 709/229 |
| 6,199,106 B1 | * | 3/2001 | Shaw et al. | 709/217 |
| 6,233,577 B1 | * | 5/2001 | Ramasubramani et al. | 707/9 |
| 6,246,994 B1 | * | 6/2001 | Wolven et al. | 705/14 |
| 6,261,103 B1 | * | 7/2001 | Stephens et al. | 434/276 |
| 6,270,351 B1 | * | 8/2001 | Roper | 434/118 |
| 6,282,404 B1 | * | 8/2001 | Linton | 434/350 |

(Continued)

*Primary Examiner*—Zarni Maung
*Assistant Examiner*—Backhean Tiv
(74) *Attorney, Agent, or Firm*—Head, Johnson & Kachigian

(57) ABSTRACT

A comprehensive system, process and article of manufacture to facilitate comprehensive institutional, regulatory and individual continuing education (a.k.a. "CE") requirements via a communications network comprising interactive processing components to facilitate web-based CE tracking and reporting for employers, group member registration, small business member registration, CE content providers & CE accrediting agencies, CE content editor functionality, site-to-site data transfer, provider reporting to accrediting entities, relationships with professional associations, remote CE training, tracking and distribution, CE applications service provider services, individual professional CE services, CE guidance and portfolio management, CE portfolio setup and customization, CE reporting for license reinstatement, an industry portal for licensed professionals, individual member registration, state regulation services and automated e-licensure/e-certification renewal.

3 Claims, 17 Drawing Sheets

U.S. PATENT DOCUMENTS 6,292,905 B1 * 9/2001 Wallach et al. ................. 714/4
6,301,462 B1 * 10/2001 Freeman et al. ............ 434/350
6,334,133 B1 * 12/2001 Thompson et al. ...... 707/104.1
6,370,355 B1 * 4/2002 Ceretta et al. .............. 434/350
6,546,230 B1 * 4/2003 Allison ....................... 434/350
6,662,194 B1 * 12/2003 Joao ........................ 707/104.1
6,755,659 B1 * 6/2004 LoSasso et al. ............ 434/219
6,915,265 B1 * 7/2005 Johnson ......................... 705/2

* cited by examiner

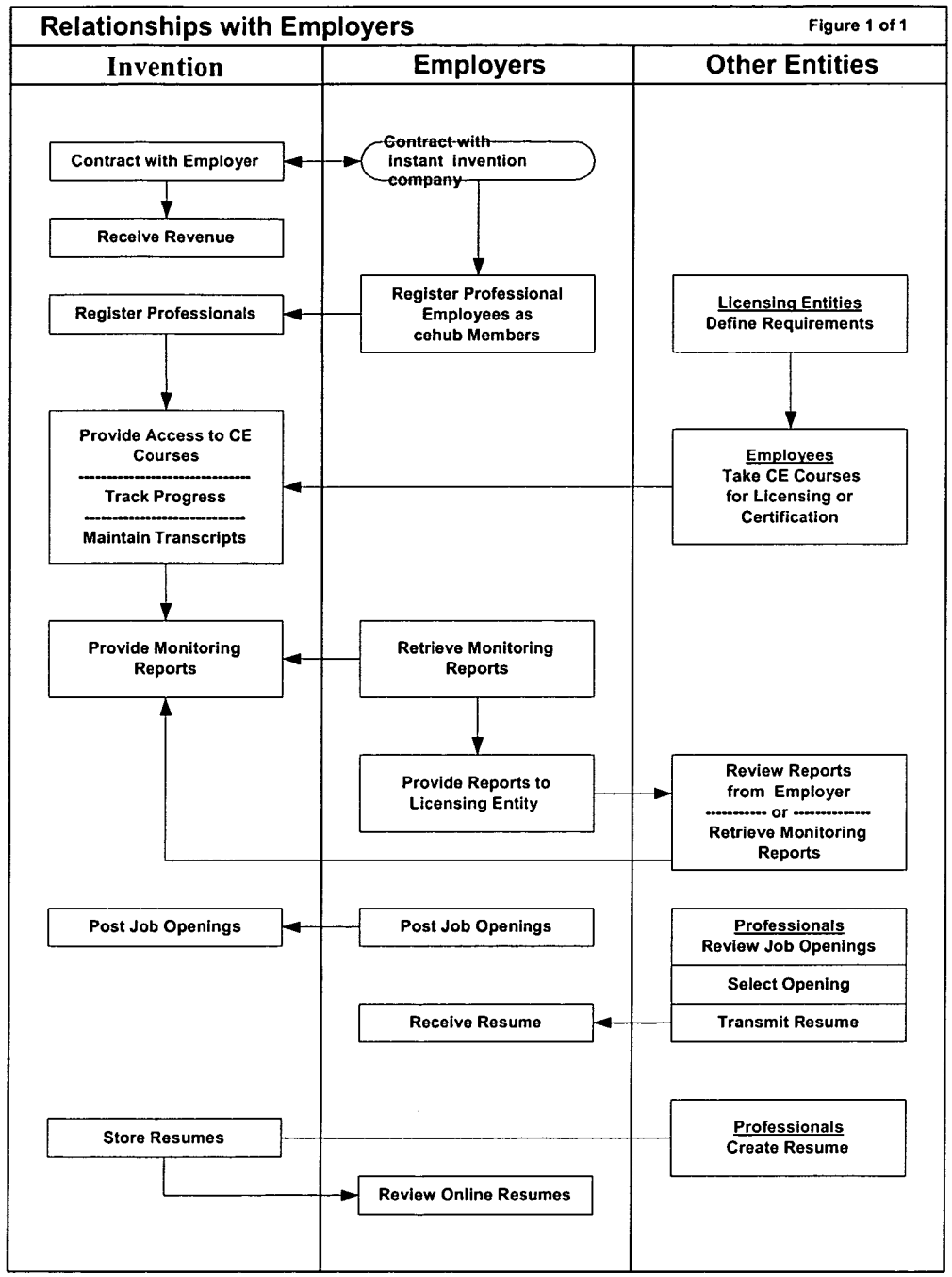
Figure 2 - Relationships with Employers

Figure 4 – Group Registration Process

Figure 5 - Web-based CE Tracking and Reporting for Employers

Figure 6

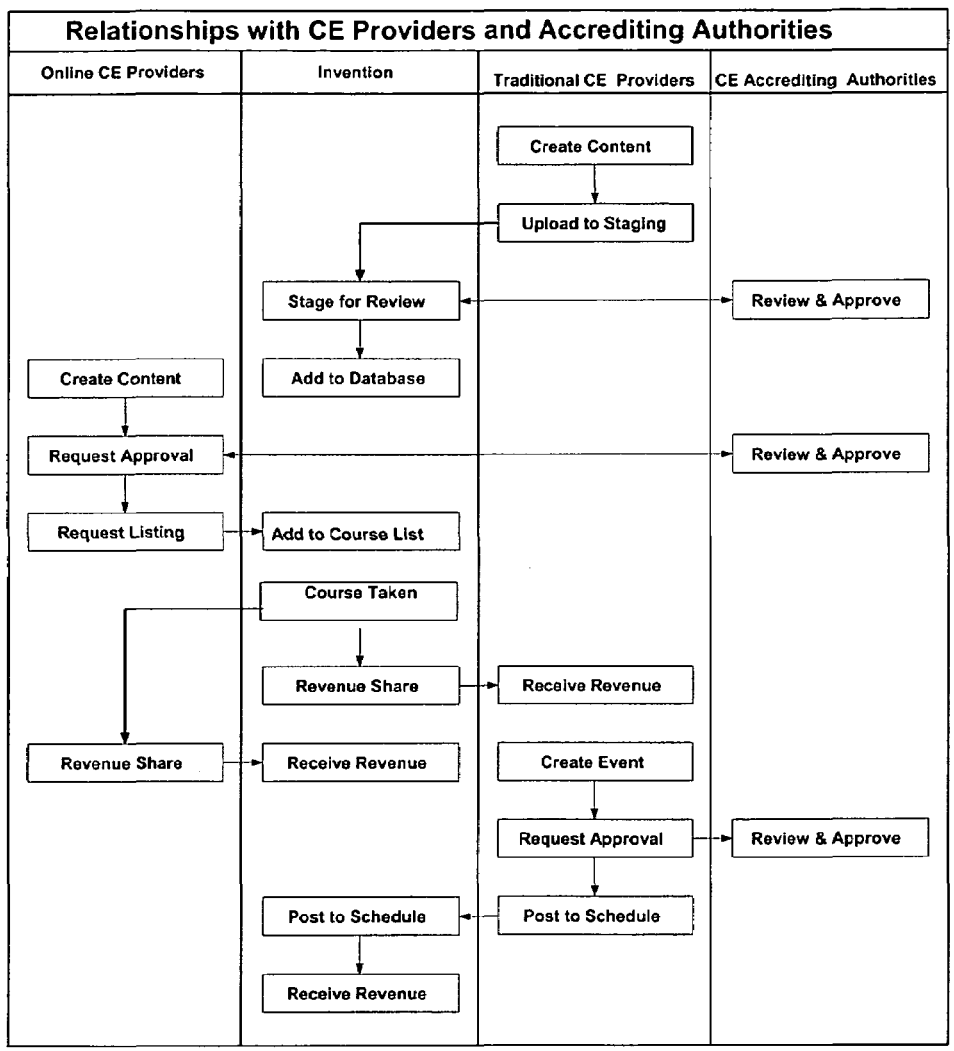
Figure 8 - Relationships with CE Content Providers and Accrediting Authorities

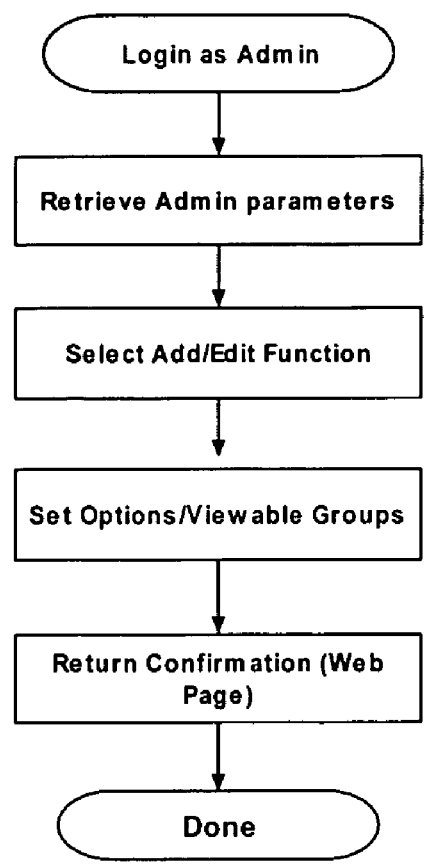
Figure 9 - CE Content Process

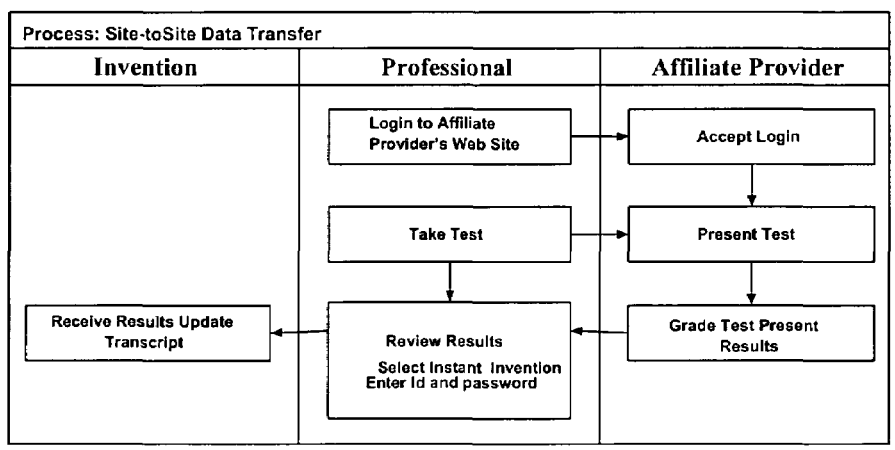
Figure 10 - Site-to-Site Data Transfer

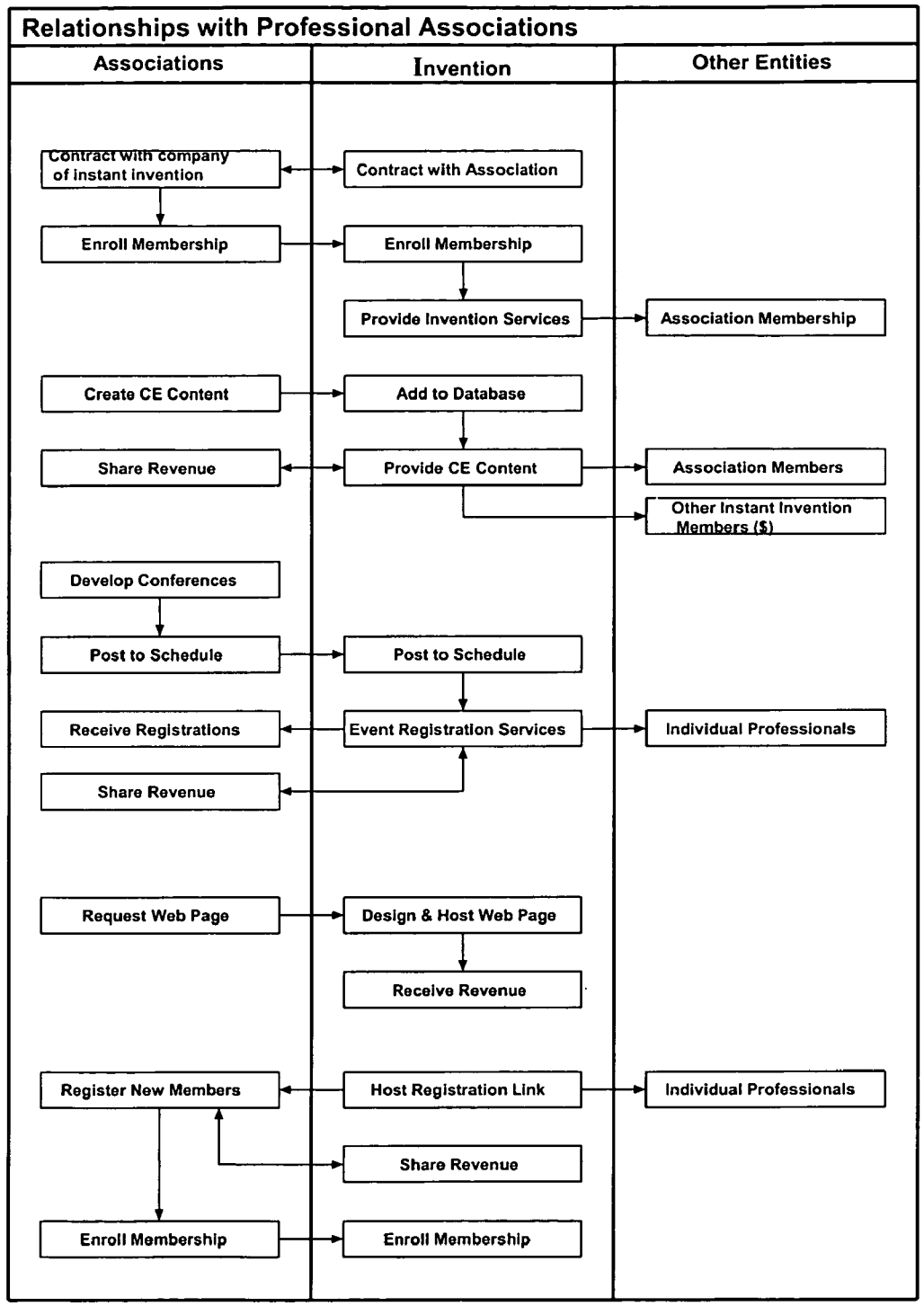
Figure 11 - Relationships with Professional Associations

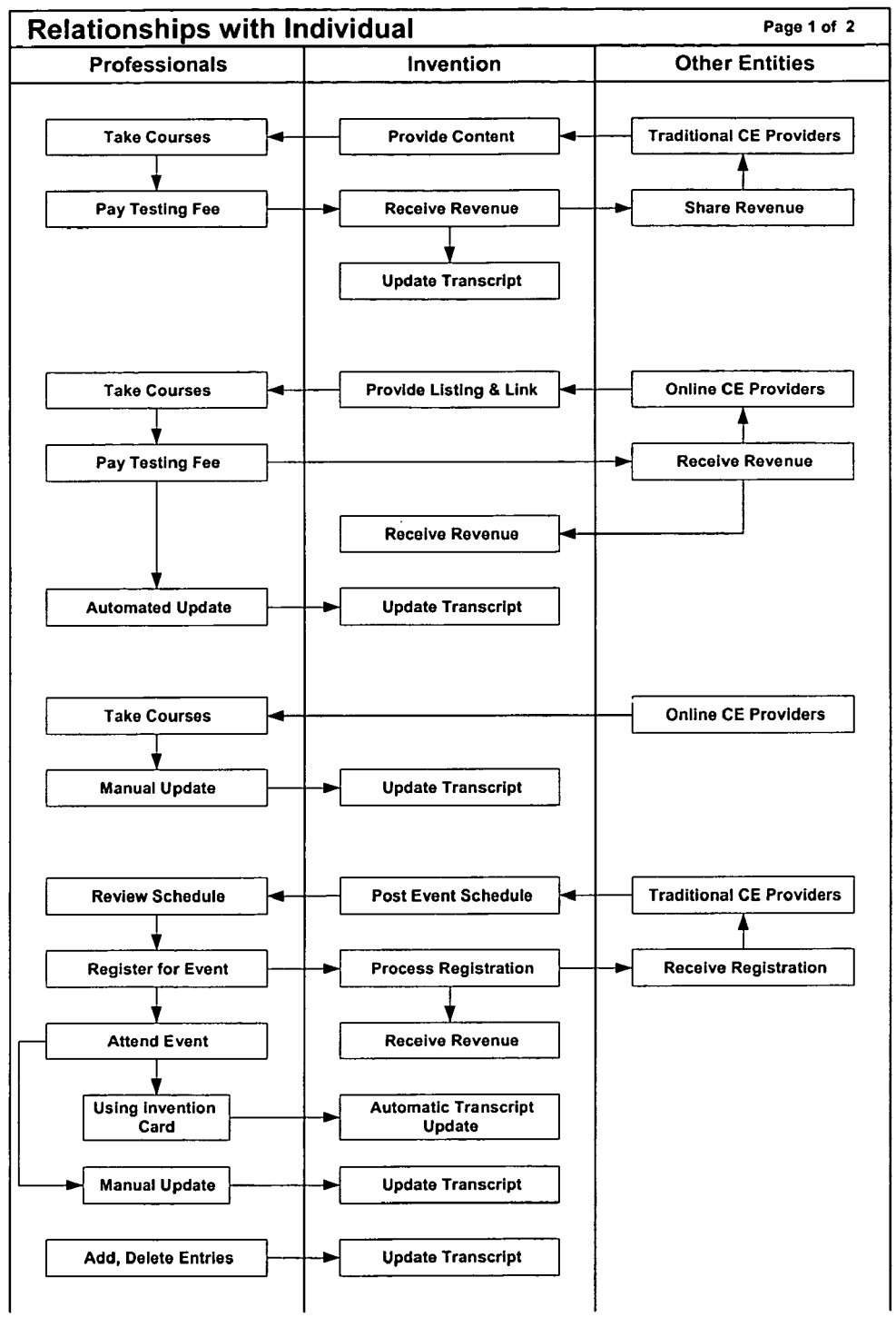
Figure 12A - Relationships with Individuals (part 1)

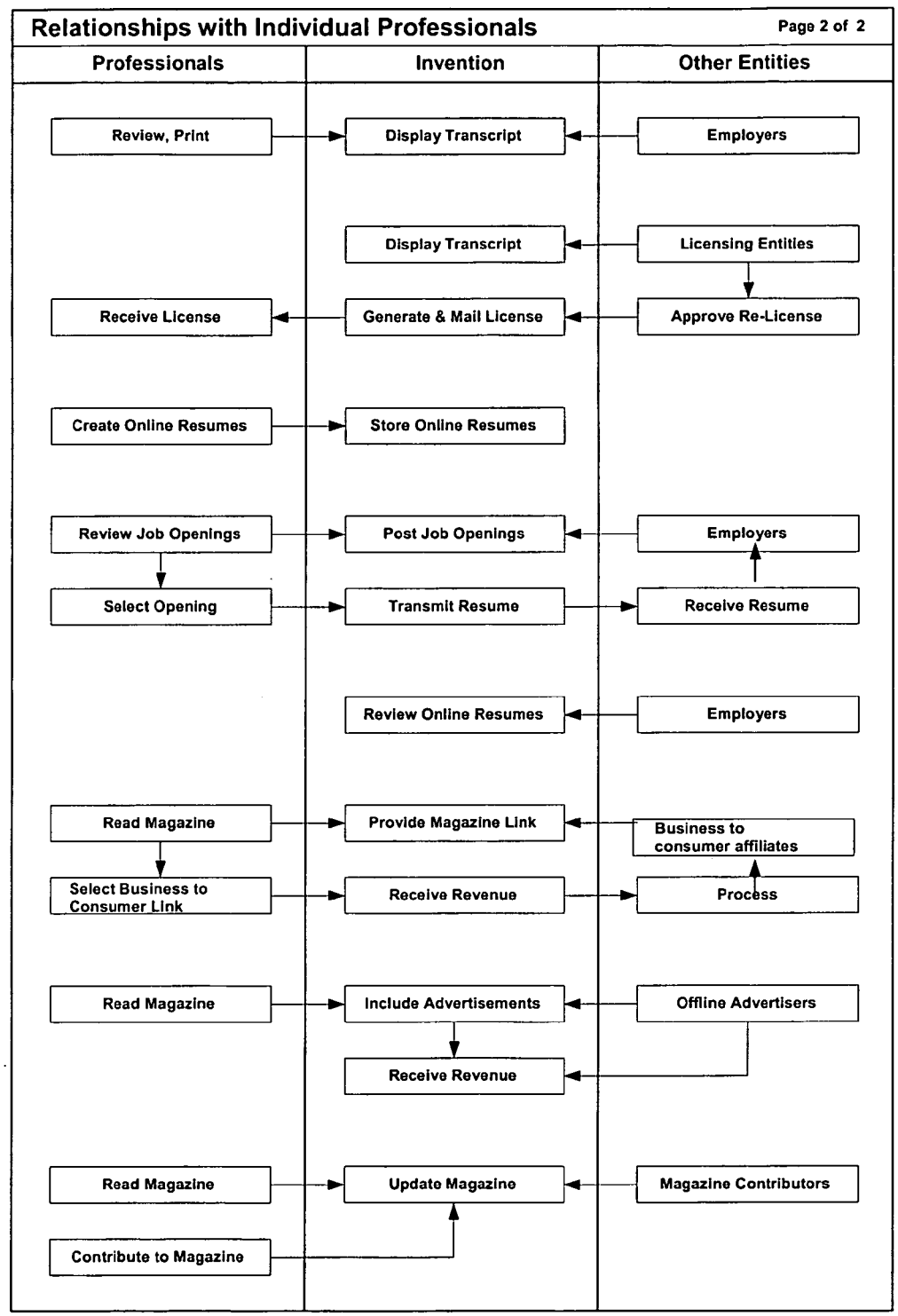
Figure 12B - Relationships with Individuals (part 2)

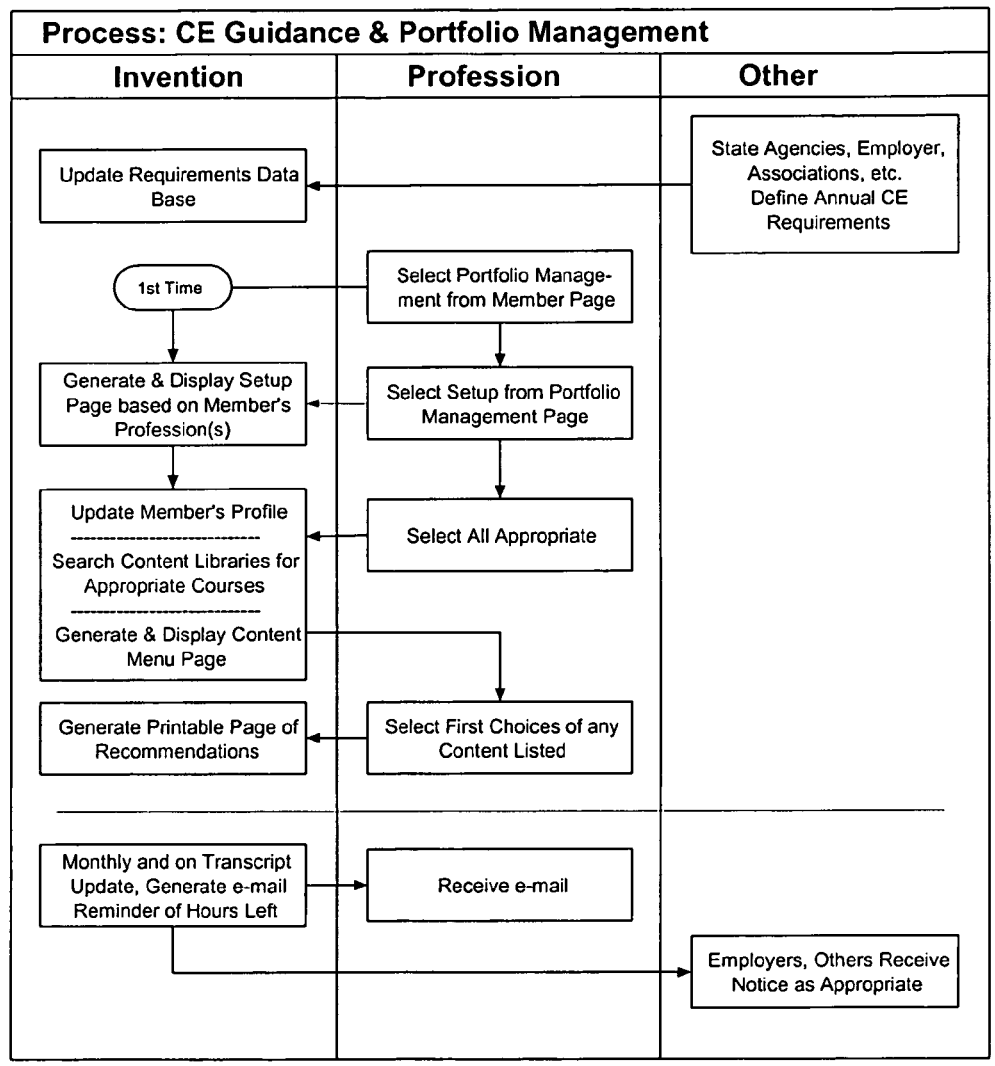
Figure 13 - CE Guidance & Portfolio Management System

Video title: (list title)

Description of the Video: (from content editor)

Length of Video: (from content editor)

Accrediting Agency: (from content editor)

Credit Hours: (from content editor)

The cost to view this video is XX, testing is FREE

This video contains X segments. Fees and testing apply to each segment

| Proceed to Video | Proceed to Test | Return to Articles |

Time required to download this video will vary dependant upon connection speed

Windows Media Player is
required to view this video

Figure 14 - Video on Demand Form

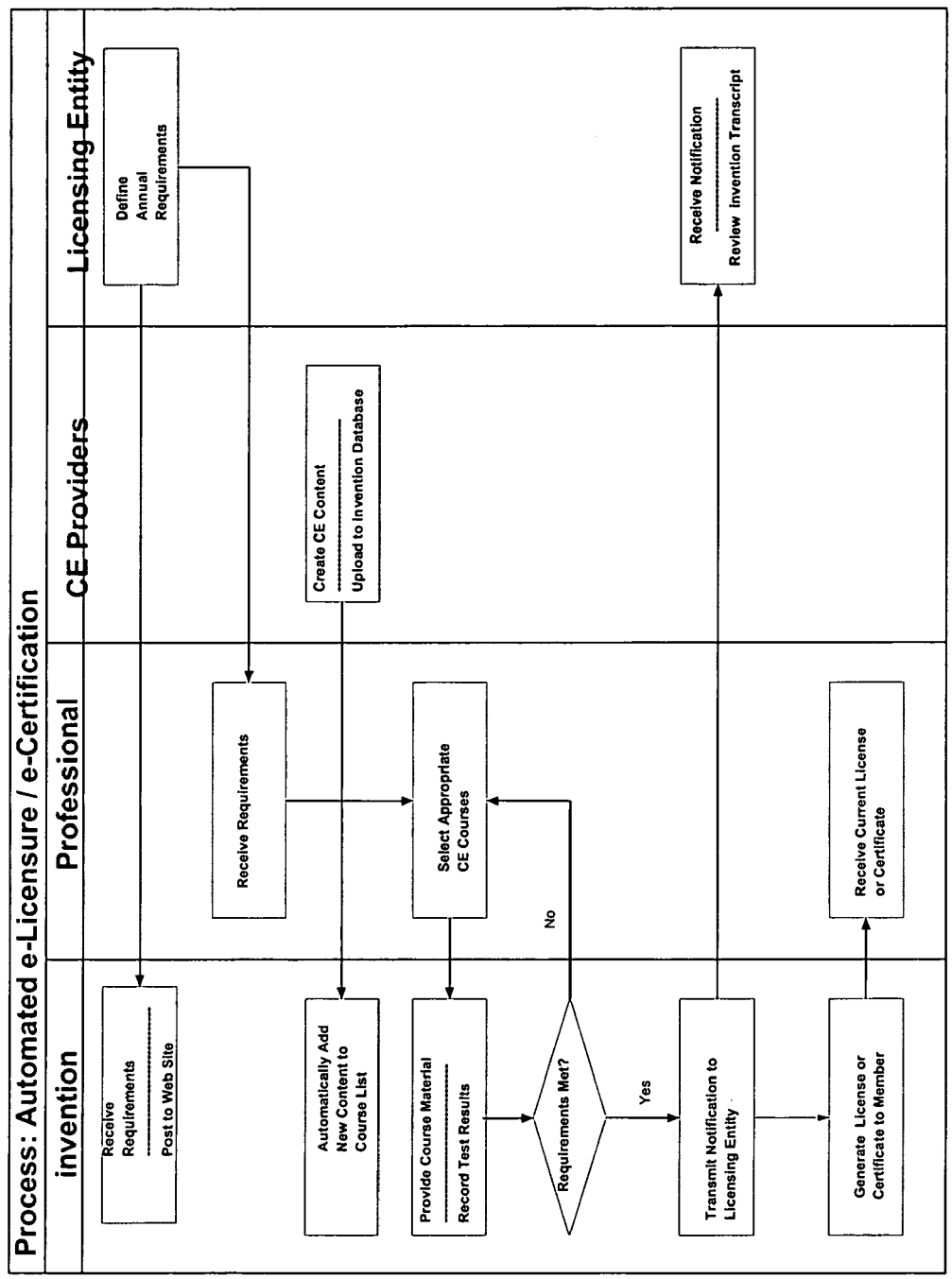
Figure 15 - Automated e-Licensure/e-certification

COMPREHENSIVE SYSTEM, PROCESS AND ARTICLE OF MANUFACTURE TO FACILITATE INSTITUTIONAL, REGULATORY AND INDIVIDUAL CONTINUING EDUCATION REQUIREMENTS VIA A COMMUNICATIONS NETWORK

This application claims benefit of Provisional No. 60/208,721 filed Jun. 1, 2000.

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

In general, the present invention relates to automated reporting and accountability services. In particular, the present invention relates to a comprehensive computer-based system, process and article of manufacture to address institutional, regulatory and individual continuing education requirements via a communications network.

BACKGROUND OF THE INVENTION

The Professional

Currently, Employers, Professional Associations and Regulatory Boards dictate continuing education requirements of the professional. Generally, requirements of these entities' vary and the professional cannot use the continuing education credits granted by one group to fulfill the requirements of another. In addition, keeping track of changing requirements, the certificates for the acquired continuing education and reporting the continuing education credits to the various groups becomes a maze for the individual. Professionals also lack access to the appropriate number of continuing education credits and appropriate topics to really meet all the requirements placed on them by the groups that dictate the continuing education requirements. The trends indicate a pattern of increasing continuing education and professional portfolio requirements. As a result, individuals are not meeting compliance requirements due to the complexity and diversity of current systems.

Employers

Most employers lack a comprehensive centralized system incorporating content, tracking, and reporting of continued education requirements for the purpose of maintaining accreditation standards. These tasks are typically performed in an atmosphere of crisis as an attempt to stave off sanctions from the respective accrediting agency. FIG. 1A illustrates the complexities and inefficiencies of contemporary decentralized models.

Regulatory Boards

Regulatory Boards license and regulate an individual professional and are responsible for assurance to the public that a professional is competent in their field of licensure. Three standard ways of doing this is through continuing education, the professional portfolio, and competency measurement. Regulatory Boards, burdened with an immense number to regulate, currently must settle for random, shallow, competency audits on a small percentage of their licences to demonstrate compliance to the public. Because of the high cost of the current evaluation systems and the lack of reporting system options, the Boards must settle for honor system as a reporting mechanism of the professional.

Content Providers

Content providers are pressured by new regulations requiring in-depth reporting on usage of their product, with records to be maintained for a period of 5 years—a substantial increase in workload. The cost of developing a product, getting it accredited, creating a system to provide the relevant usage information and marketing it is too costly for content providers to stay in the content provider market. Currently, there is no real way to enforce the requirements that create an issue of non-compliance. Further, providers with experience and knowledge in specific areas are leaving the provider market and the professional is losing this vital knowledge base.

Accrediting Agencies

There are various types of accrediting agencies. Accrediting agencies certify healthcare facilities and they accredit continuing education materials, seminars, conferences and educational institutions. These accrediting agencies regulate the above mentioned sources of products or services for the purpose of ensuring to their customer that they are getting a quality product or service. Standards required for initial or continued accreditation are difficult to enforce because there is no real mechanism for that enforcement. The requirements become an issue of non-compliance. Trends lend to increasing requirements to make professional practice more competent. Currently, these agencies are looking for a robust system to aide them in enforcing these requirements.

The functionality and benefits of the instant invention can be best be contemplated and appreciated as a means by which computer-based system and business method of the instant invention facilitates the resolution of long standing inefficiencies long endured by diverse user communities. Such communities would typically include but not be limited to, the professional, employers, professional associations, regulatory boards, content providers, and accrediting agencies. From the proceeding summary of contemporary user group problems, it is clear the present art is woefully absent a comprehensive system, process and article of manufacture whereby a plurality of continuing education requirements can be addressed. Such requirements including, but not limited to, report processing, auditing, accreditation, licensure, course verification and on-demand report processing. Needs and services addressed by, and offered to, the above-noted communities via practice of the instant invention.

BRIEF SUMMARY OF THE INVENTION

The instant invention places its unique system, business method and software processing components and databases in the center of all activities associated with the maintenance, tracking, reporting and continuing educational credits and requirements of a plurality of user communities.

FIG. 1B is a non-limiting illustration of centralized user community processing component interrelationships.

Succinctly stated, the instant invention allows information to be stored in a centralized database with access facilitated thereto via a system accessible to all interested parties via the Internet or other computer compatible communications network such as but not limited to the Internet.

In brief, the invention's unique services allow information to be stored in a centralized database system easily accessible by all interested parties via the Internet. This, in turn, allows the instant invention to develop relationships not only with individual professionals, but also with their employers, professional associations, continuing education content providers and the agencies responsible for approving their licensure or certification. Additionally, these relationships allow the instant invention to extend its services to develop relationships with accrediting agencies for employers and continuing education content providers.

It should be noted, however, that while the instant invention provide many services specifically tailored to the individual member and each of the organizations mentioned, there is often a blurring of distinction. For example, employers such as hospitals and universities may also be providers of continuing education (a.k.a. "CE") courses and can utilize the services available to CE content exclusive to their membership and can thus utilize these same services. Even individual members may avail themselves of these services should they desire to become content providers. Consequently, it is an object of the instant invention to facilitate via a computer compatible communications network interactive processing web-based CE tracking and reporting for employers.

A further object of the present invention is to facilitate via a computer compatible communications network interactive processing group member registration and small business member registration(s).

An additional object of the instant invention is to facilitate via a computer compatible communications network interactive processing CE content providers & CE accrediting agencies.

Yet another object of the instant invention is to facilitate via a computer compatible communications network interactive processing CE content editor functionality, site-to-site data transfer and reporting-providers to accrediting entities.

A further object of the present invention is to facilitate via a computer compatible communications network interactive processing relationships with professional associations, remote CE training, tracking and distribution.

An additional object of the instant invention to facilitate via a computer compatible communications network interactive processing CE applications service provider services.

A yet further object of the instant invention is to facilitate via a computer compatible communications network interactive processing individual professional CE services, CE guidance and portfolio management, CE portfolio setup and customization, CE reporting for license reinstatement, industry portal for licensed professionals, individual member registration, state regulation services and automated e-licensure/e-certification renewal.

Other objects and further scope of the applicability of the present invention will become apparent from the detailed description to follow, taken in conjunction with the accompanying drawings wherein like parts are designated by like reference numerals.

A more complete understanding of the invention will be obtained by reference to the following specification of the preferred embodiment, taken in conjunction with the attached drawings.

DESCRIPTION OF THE DRAWINGS

Prior Art

FIG. 2 is an illustration of non-limiting examples and process interactions between the present invention and Employers.

FIGS. 6 and 7 are illustrations of a Small Business Registration GUIs as practiced in the invention preferred embodiment.

FIG. 8 is an illustration of the relationship with CE Content Providers and CE Accrediting Agencies as practiced in the invention preferred embodiment.

FIG. 9 is an illustration of the CE Content Editor processing component as practiced in the invention preferred embodiment.

FIG. 10 is an illustration of the Site-to-Site Data Transfer as practiced in the invention preferred embodiment.

FIG. 11 illustrates the present invention's Relationships With Professional Associations when practiced in its preferred embodiment.

FIGS. 12A and 12B are illustrations of the Relationships With Individual Professionals as practiced in the invention preferred embodiment.

FIG. 13 is an illustration of the Portfolio Management System as practiced in the invention preferred embodiment.

FIG. 14 is an illustration of a Video On Demand GUI Form as practiced in the invention preferred embodiment.

FIG. 15 is an illustration of the Automated e-Licensure/ e-Certification as practiced in the invention preferred embodiment.

DETAILED DESCRIPTION OF A PREFERRED EMBODIMENT

Figure 1A:
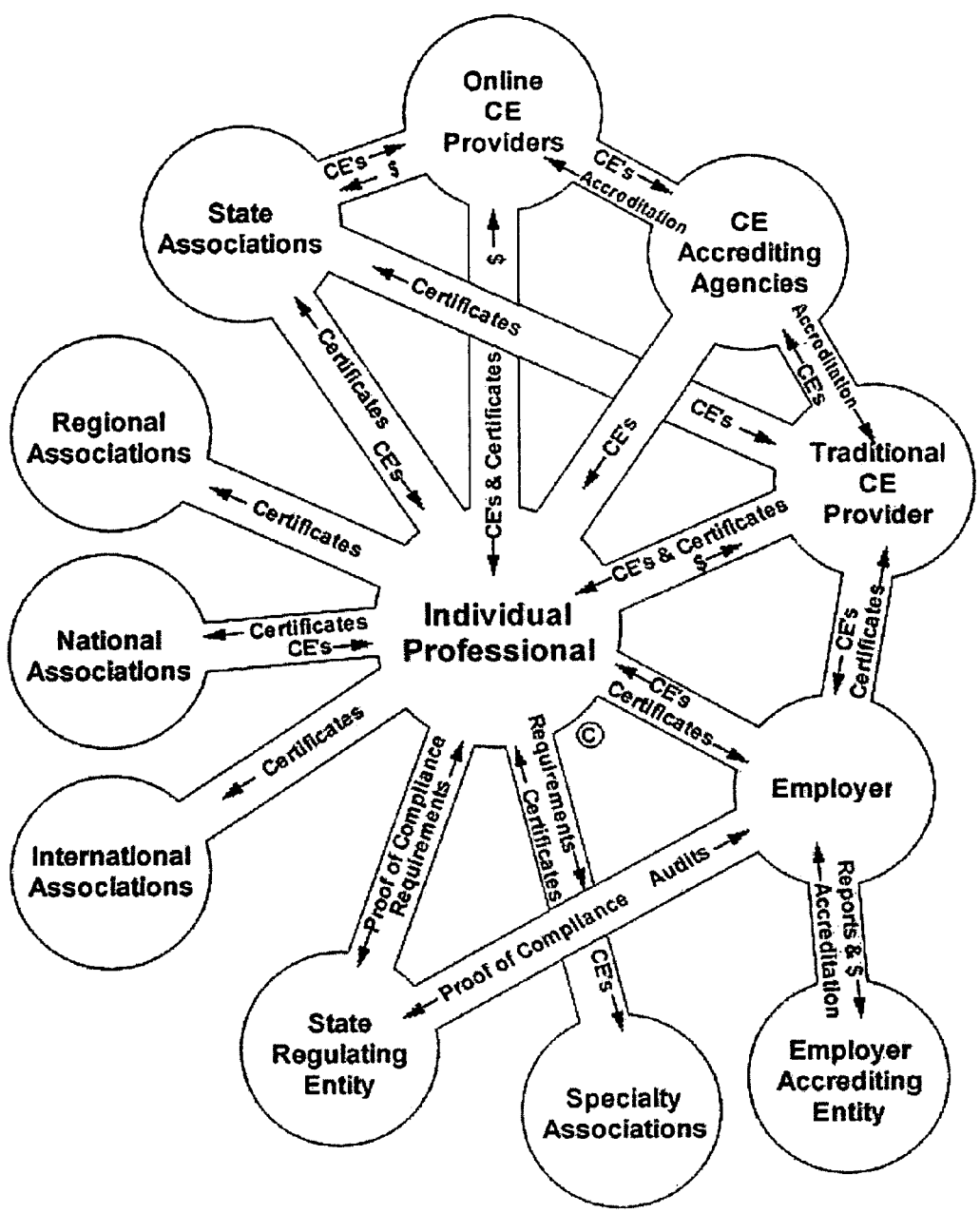
FIG. 1 is prior art illustrating inefficiency associated with a contemporary decentralized continuing education processing model.
FIG. 1B is an illustration of a centralized user community processing model and interrelationships as practiced by the instant invention in its preferred embodiment.
Figure 1B:
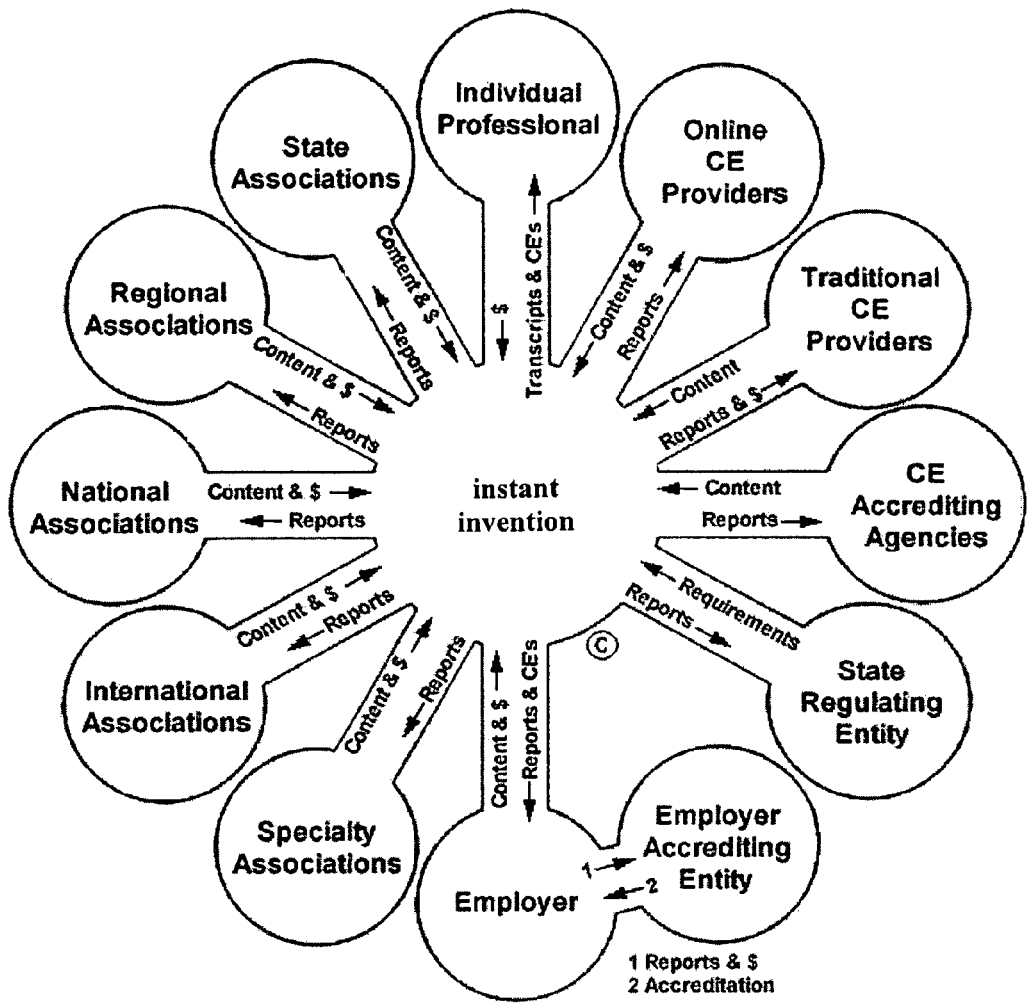

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Relationships With Employers

The present invention's primary relationship with employers is to provide web-based tracking and reporting of CE courses and credits for individual professionals within their employ via a computer compatible network. In some cases, employers will enter into this relationship with the present invention in order to aid in the maintenance of their own accreditation. Hospitals, for example, are audited by their accrediting agencies for compliance of their professional employees with individual certification requirements. Other employers will enter into this relationship to ensure continuity of their operations. As an example, Real Estate Agencies are not licensed, only their agents who, in many states, must have some number of CE credits to maintain those licenses. FIG. 2 illustrates non-limiting examples and process interactions between such relationships.

Administration & Reporting

In a typical scenario, an employer will negotiate a contract which defines the services that the instant invention will provide. When the contract is completed, invention's site administrator will add the employer to the Employers database and add or update member information identifying a specific person as an administrator for the employer.

When this specific member logs into the system, he or she will receive a link on their member page for the employer's Administration & Reporting page. A non-limiting example of such a member page is provided as FIG. 3 and illustrates invention functionality available to an employer's administrator.

Group Registration

Figure 4:
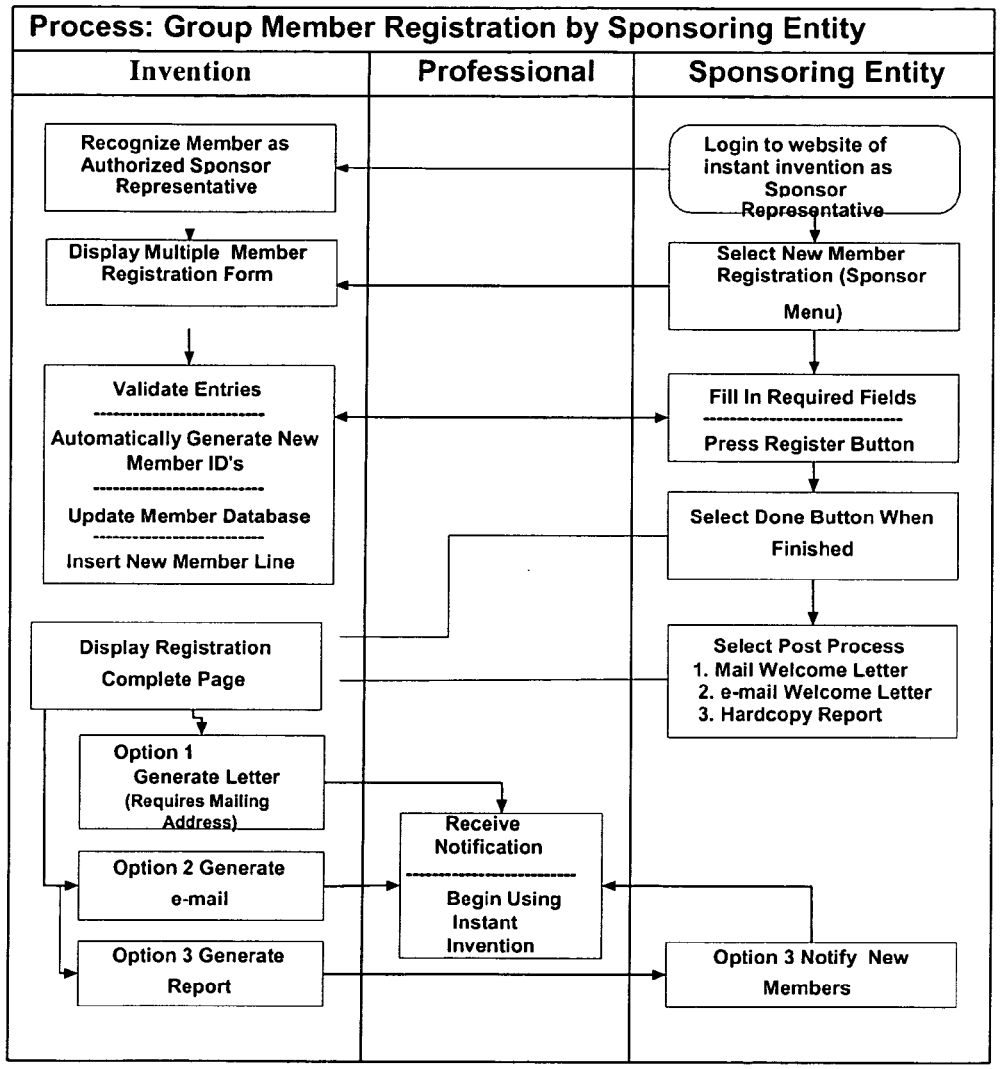
FIG. 4 is an illustration of the Group Member Registration Process as practiced in the invention preferred embodiment.

This invention processing component is illustratively provided in FIG. 4 and provides for authorized representatives of sponsoring entities to register multiple individuals as new members of the instant invention. An authorized representative of a sponsoring entity accesses the instant invention web site via the Internet, logs in to the system and selects New Member registration from a Sponsor's menu. The software associated with this invention then displays a web page form for entering information about the new member to be registered. When the sponsor has completed the form and selected a "Register" button, the invention validates the information entered (displaying error messages as appropriate), generates the new member's identification code and password, adds the new member's data to the instant invention's member database and displays a message indicating the member has been registered. When the sponsor has finished entering new member information, he/she selects a "Done" button. The invention then displays a web page for the sponsor to select one or more post registration options. These options depend on the optional information included with each new member's data and include e-mail of a welcome letter to either the member's corporate or personal e-mail address or instant invention's e-mail address, a printed welcome letter or a report of new members added which can be used by the sponsor to notify new members. Only the options applicable, based on the sponsor's input, are displayed. The software associated with this invention processes all options available, generating welcome letters or reports as appropriate.

Web-based CE Tracking and Reporting for Employers

Figure 3:
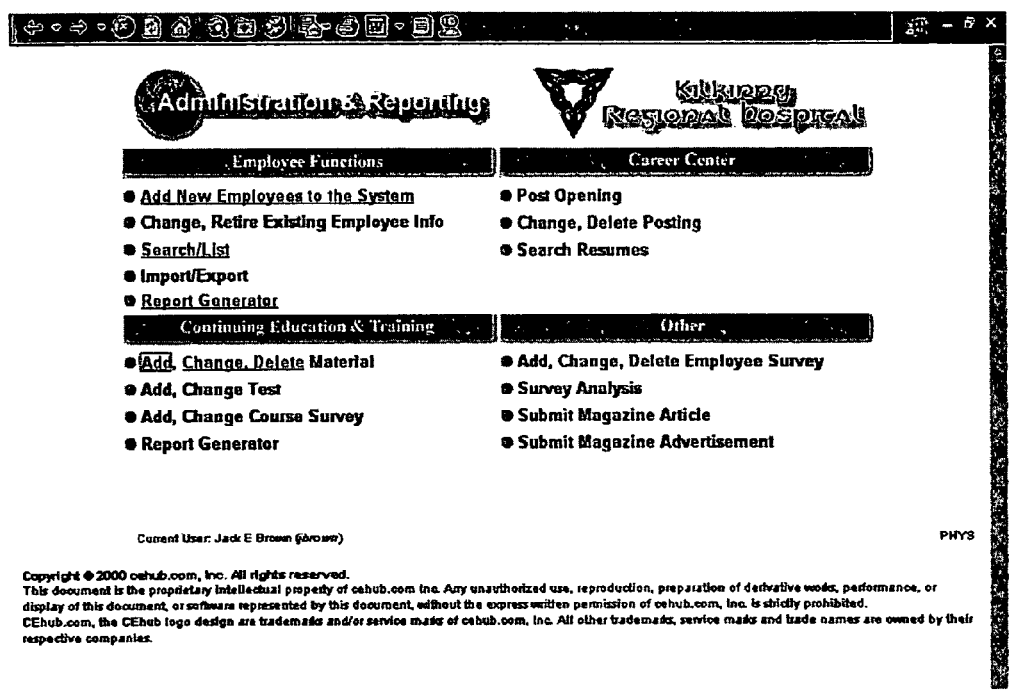
FIG. 3 illustrations of Employer Administrative Functions presented as a member webpage when practicing the invention in its preferred embodiment.
Figure 5:
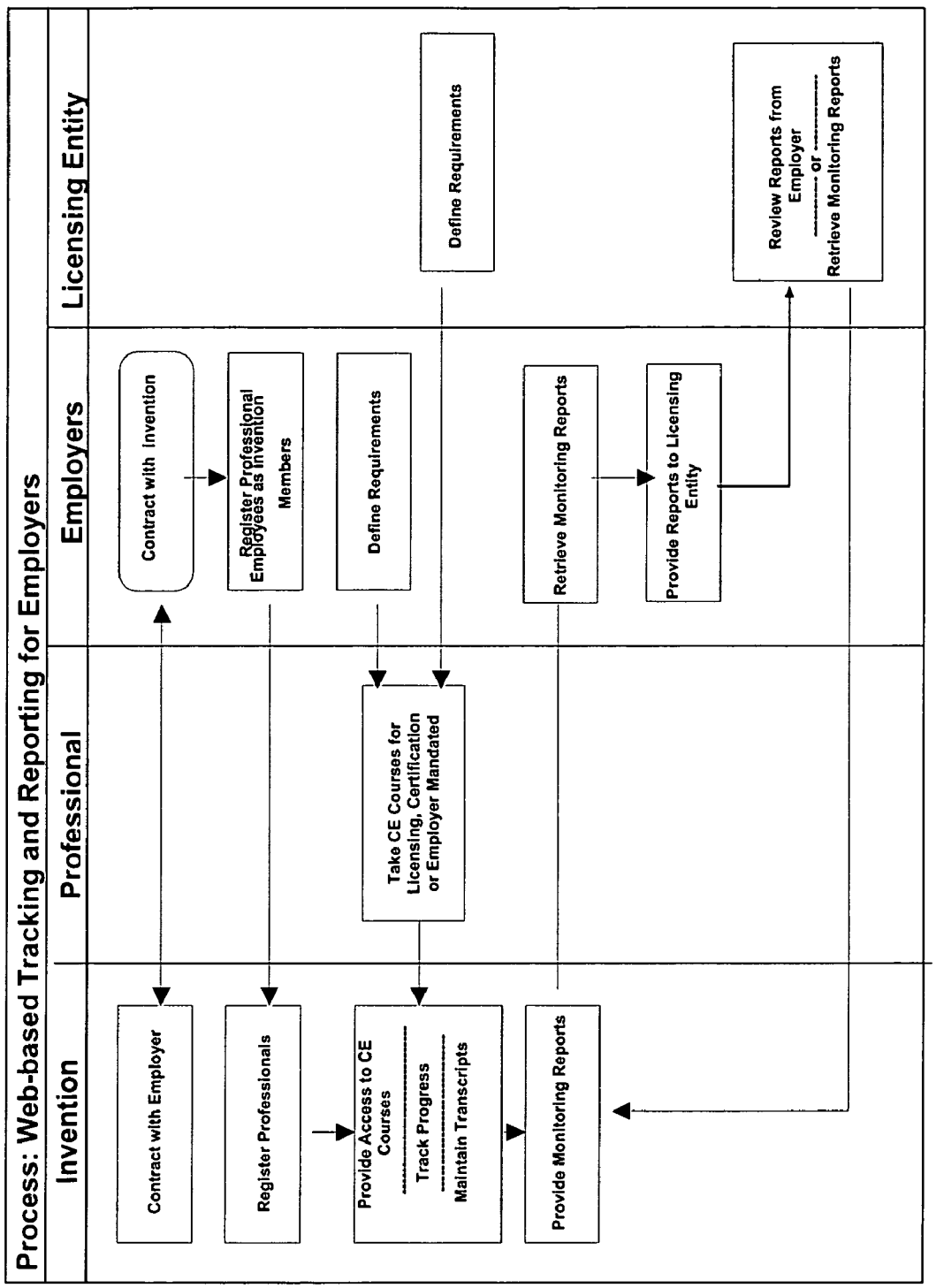
FIG. 5 is an illustration of a web-based CE tracking and reporting interrelationships for employers as practiced in the invention preferred embodiment.

An employer can register all professional employees thru the Group Member Registration Process as discussed in association with FIGS. 3 and 4. Once accomplished, employees can utilize the instant invention's CE content (or that of other content providers) to maintain the requirements specified by their licensing entities. Whenever the employer desires, various monitoring reports may be retrieved for review. Where appropriate, these reports may be forward to the employer's licensing entity or reviewed by that entity itself if it has a relationship with the instant invention. FIG. 5 presents in an illustrative manner web-based CE tracking and reporting afforded to employers by the instant invention when practiced in its preferred embodiment.

Small Business Member Registration

Figure 6:
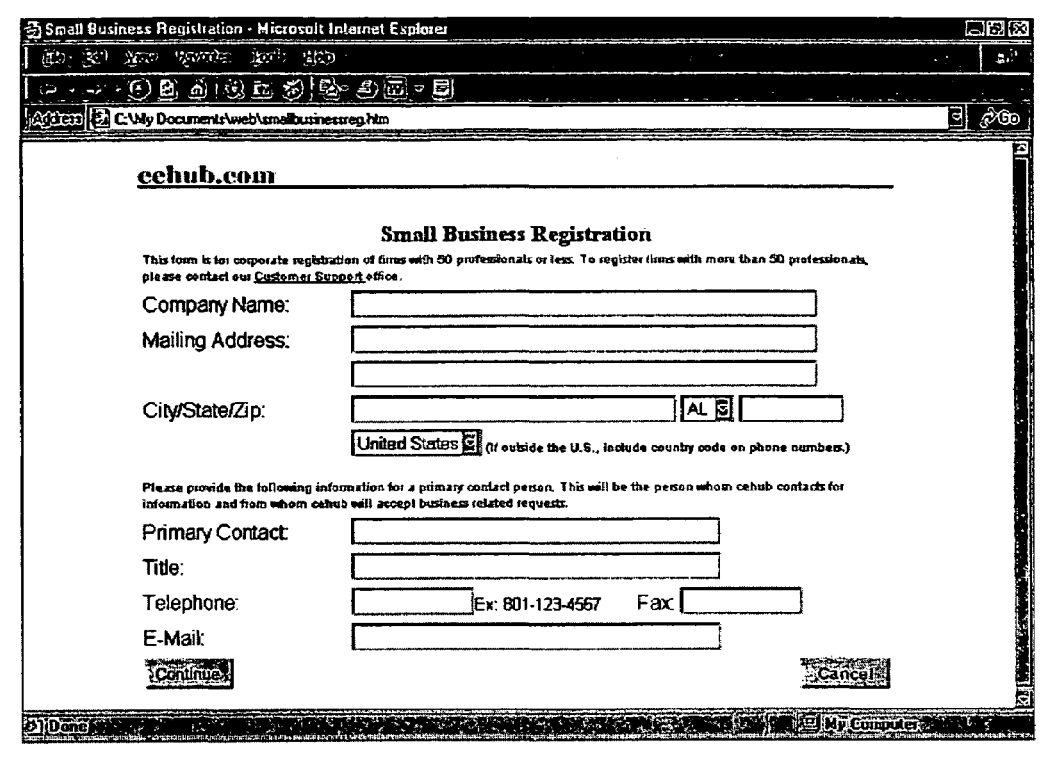
Figure 7:
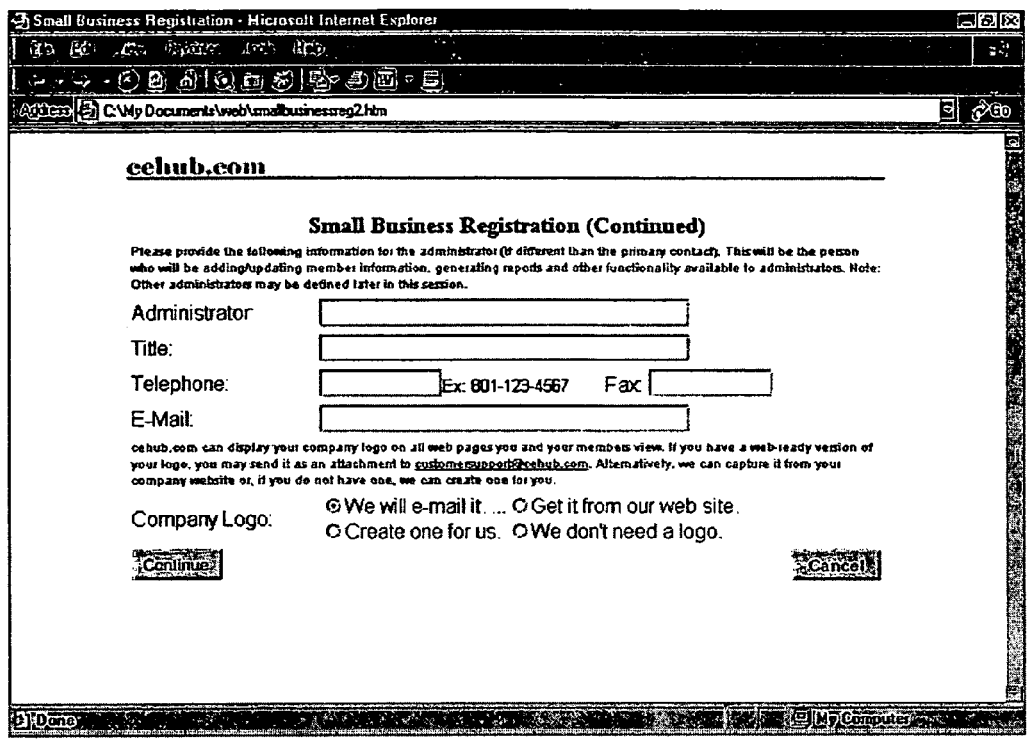

This requirement covers the online registration process for small businesses. For purposes of this disclosure, a small business is defined as any business with 50 or fewer employees who require servicing via the business method processing components of the instant invention. Such processing is accommodated via web page interface on is presented as an illustrative example as FIGS. 6 and 7.

- Access is facilitated via a "Small Business Membership" button.
- A business registration page is provided to capture the basic information about the company (name, address, phone, etc.).
- A "Group Member Registration" page is provided for individual member registration. This should be essentially the same as the "Group Member Registration" page already defined although actual database updates will be suspended until final acceptance by the customer (See next).
- A membership verification page is provided listing individual members by category and an overall price quote. Pricing will be based on Premium Membership for each category. This page should include "continue" and "cancel" buttons. Actual member registration will occur when the "continue" button is selected.
- A secure page is provided for credit card information will be displayed (if this method of payment is selected). If this is a registration of additional members and the company has a credit balance, they will have the option of using those funds.

Remote Training, Tracking & Distribution System

This processing component facilitates the use of the instant invention's database collection and it's related systems to track and maintain information for inclusion on a computer generated individualized education transcript by interacting with a "Smart Card" or electronic data imbedded card, similar in size and shape of a credit card.

"Smart Cards" and other electronic data imbedded cards allow specific information to be stored on the card. This information normally includes, but is not limited to, the instant invention's member login ID, owner's name, address, phone number, fax number, web address, certain license numbers, profession, and similar information used to maintain a transcript.

1. A member of the instant invention is issued an invention card upon complete registration.
2. Each card will have a unique alphanumeric id used to collect points with invention affinity partners.
3. The card will be used during their enrollment and participation in employer/employee training, conferences, conventions, seminars and any other training or attendance related event.

4. The card's smart chip will identify the user so that the transcript can receive the correct information for the activity that they were involved in.
5. To capture the necessary information at the activity site, the use of a card reader is required. These card readers will be able to interact with a data storage device (computer, palm pilot, etc.
6. The data storage device is programmed to show a unique training reference number for the activity.
7. This training reference number is associated with the description of the activity in the main database of the instant invention.
8. Before the activity is started, the training provider (employer, association) will submit the activity information via a form page.
9. The form page will then respond with the unique number associated with the activity.
10. This number will include the training provider code followed by the sequential number for this training. It will then be introduced into a data storage device located at the activity site with a software program interacting with a card reader device.
11. When an activity is started, invention members will insert their cards in a reader to show that they are beginning the activity.
12. When the activity is completed, the member will insert their card in the reader to show that they have completed it.
13. This information, now stored in the data storage device is transferred to the main database for the instant invention and will be instantly added to their individual transcripts.
14. The report editor for the training provider should be able to locate and process a report for specific information on this and all activity they have conducted.
15. Employers will then be able to download reports on employee attendance.
16. Information can now be reported to the individual, their employer, regulatory agency, or professional association.

Relationships with CE Content Providers & CE Accrediting Agencies

The services provided by the present invention to CE Content Providers are essentially designed to make their work available to the present invention's membership and are presented and disclosed in association with FIG. 8. For traditional content providers (those without an Internet presence), the present invention provides a content editor which allows the provider to upload content to the present invention's website. This is augmented with the ability to move currently accredited content directly to the web or to stage un-accredited material for review by an accrediting authority.

Online CE Content Providers (those with an Internet presence) may also affiliate with the present invention. In this case, the online providers are provided a mechanism for requesting the inclusion of their courses in our course listings.

The services provided to CE Accrediting Authorities are two-fold. One is the ability to review CE content on the present invention's staging database and to approve or disapprove it for accreditation. The second is the ability to compile usage data on particular CE courses and provide reports and statistical data to the provider.

CE Content Editor

The purpose of the present invention's content editor is to allow administrators access to the back-end of the system. Here additions, deletions and changes can occur without users on the front-end of the system having to experience downtime. FIG. 9 discloses processing associated with the invention's content editor.

An administrator will access the administration site for the present invention and login by entering a user name and password to obtain access to the content editor. An administrative screen will appear and the administrator will click on "Add New Article" and complete the form and scroll down the page checking the group or groups allowed to view this article, and information boxes concerning contact hours. The administrator enters the article via a "copy and paste" into the editor. The article is now ready to be posted online, the administrator click's SAVE and note that the article is immediately sent to the web.

The editor is also capable of uploading images, which is done through an equally simple process. Once a provider is in the administration site: click on Upload Images. Load your image into the library by clicking Browse. Choose the image and click the Preview button to view. Enter a description of the image and click Upload. In a few seconds, the title of your picture will appear in the image library. To complete this process, go back to the article editor and place the cursor where you want the image to appear: Insert the picture. The image will now appear within the text of the article.

Additional invention functionality provides for the support of external products such as PowerPoint and Voice Over, Video on Demand, Streaming Video and Video Conferencing capabilities. Other invention capabilities include loading html pages through the editor and animated images to create a greater sense of understanding for difficult topics (i.e.: circulatory system of the heart). FIG. 9, illustrates the CE content processing equipment as practiced in the invention's preferred embodiment Site-to-Site Data Transfer The present invention's site-to-site data transfer is illustrated in FIG. 10 and intended to provide an automated means of transferring CE credits earned online from an affiliate provider to the member's transcripts. It presumes that the affiliate provider has signed an agreement with the present invention to do two things; (1) provide specific information on it's "Test Results" page required by the present invention's transcript processes and (2) include an executable supporting the transfer process (provided by the present invention) on their server. The professional would select the present invention's logo to initiate the transfer process.

Reporting—Providers to Accrediting Entities

Content providers are required to maintain testing activity data related to participants "passing" respective courses for a period of 5 years, and report to their accrediting agency such results. The current platform for dissemination and utilization of course materials through hard-copy journals creates an infeasible requirement for content providers to maintain compliance given the voluminous and decentralized nature of magazine distribution and utilization.

The present invention's solution, utilizing a centralized distribution platform via a "reseller of content" model allows centralized query capabilities to produce legislatively required reporting of usage. the present invention solution compiles usage data through an oracle database export into predefined fields correlating to specified agencies, associations, and/or groups.

Relationships with Professional Associations

As illustrated in FIG. 11, the present invention offers an array of reporting and tracking processes that are beneficial to an association. Reporting and tracking membership information, CE information, Professional Portfolio information and the ability to do certification, re-certification and licensure or re-licensure issue or verification to name a few. Additional services include providing an avenue to accredit others content, have their CE content accredited, market and distribute their content. Revenue sharing and mutually beneficial exchange of services are other service options for associations. Providing avenues to increase memberships and produce online media, seminars, video-on-demand, Power Point CE or conferencing are other ways in which the present invention can provide services to a professional association.

CE Applications Service Provider ("CEASP")

The present invention hosts professional associations, universities, state regulatory entities and employers to hosting accredited CE study materials, certification testing, transcript management and reporting. As a CEASP, the present invention provides a virtual storefront with a wide variety of products and services and serves as a vehicle for the deployment of Internet CE services to each individual organization for the benefit of each organization's constituents.

Many organizations cannot afford, nor do they have the technical expertise, to provide a satisfactory level of educational service on the web. The proprietary Internet based system developed by the present invention provides an interface with an organization's intranet allowing for a portal to the present invention's services that appear to come from the customer's own system. Additionally, the present invention will select noteworthy content from these groups to post on the present invention's site providing additional revenue sharing for the customer organization. These mutually beneficial associations save the present invention's customers ASP implementation fees, set up charges and monthly hosting fees. This concept is very popular with the professional associations and universities. It provides an additional shared revenue source for non-profit organizations that normally are looking for additional financial resources. Additionally, the present invention receives quality content for its site, visibility and individual membership sales opportunities.

Relationships with Individual Professionals

A primary support emphasis of the individual professional is the present invention's Transcript processing interrelationship as illustrated in FIGS. 12A and 12B. Most people, at some point during their college careers, request a copy of their transcript; a neatly printed report of all courses taken to date, broken down by year and semester. Some universities even provide students with the ability to review their transcripts online via the school's Intranet. The present invention's Transcript is all of this and far more.

The Present Invention Transcript

A professional's CE requirements are defined and acquired on an annual basis. CE credits earned in prior years are typically not reported, but may be included at the member's preference. Thus, like the college transcript, our Transcript is broken down by year. However, there are no semesters in a "CE year". The present invention's Transcript is broken down, instead, by the method in which the credits were earned.

FIGS. 12A and 12B depicts a number of ways that a member's transcript may be updated. These are reflected, in turn, in the way the Transcript displays credits earned. The breakdown is as follows:

1. Hours earned through the present invention. These represent credits earned utilize the content available in the present invention's Content Libraries.
2. Hours earned through affiliated online providers. These are credits earned and recorded via site-to-site data transfer.
3. Hours earned from other providers. These are credits earned from non-affiliated online providers or traditional (offline) providers and entered into the member's transcript manually.
4. Hours earned through wireless applications. These are credits earned through courses taken via satellite broadcast, radio or hand held devices and tests taken via the present invention.
5. Hours earned through the utilization of the present invention Card. These represent attendance at seminars, conferences, employer onsite and the like where the member is able to use his or her Smart Card to record attendance.
6. Hours earned through other options (to be determined).

The format and content of college transcripts are defined by the college's administration. The format and content of the present invention's Transcript is, to a major extent, definable by the individual member. Members may predefine different "views" of their transcript based on reporting requirements or personal needs. For example, a medical doctor who is also a practicing lawyer would define a view for the medical licensing authority and a different view for the attorney licensing authority.

Portfolio Management

The CE Guidance and Portfolio Management processing component is illustrated in FIG. 13 and provides the individual professional with a simplified method of determining what CE courses are appropriate to meet requirements specified by state agencies, employers and/or associations or to satisfy personal goals.

Essentially, this component matches the requirements that have been established by various licensure and certification agencies for a member's profession with the courses available in the Content Library and generates a list from which the member may choose. Selected courses are saved in the member's database file for future reference. Additionally, periodic reminders are sent to the member including courses completed and credits remaining.

The Portfolio Management invention process will provide the individual professional with a set of tools to create and maintain a portfolio of electronic documents appropriate to their given profession. The member's portfolio will include the following documents:
Transcript
Resume
Profile
Addenda (multiple documents)
To Do List The tools associated with this process include:
The CE Guidance Tool
This tool will provide members with a simplified method of determining what CE courses are appropriate to meet requirements specified by state agencies, employers and/or associations or to satisfy personal goals.
The Resume Tool
The resume tool provides the member with an easy method of building an on-line resume.

The Addenda Tool

The addenda tool provides the member with a method for recording information specific to her/his profession.

The Portfolio Manager

The portfolio manager tool provides the member with control over the portfolio. It will have option settings to specify what data is accessible and who may access the portfolio contents.

Member Page

The Member Page contains a button, link, menu item, or hotspot referencing the CE Guidance & Portfolio Management page.

The Portfolio Management Page

This page provides access to the tools associated with this process and links to the various documents stored in the portfolio.

The CE Guidance Tool is essentially a form to allow the member to identify his/her professional relationships preparatory to generating a list of appropriate content. This page will include a section for each professional category identified upon registration. Each section will include:
- A multi-select drop-down list of State agencies which license or certify this profession's activities. This list will include agencies in all 50 states. International versions will have varying requirements based on each country's licensing practices.
- A list of associations, organizations and societies to which a member of this profession might belong. This list will include associations in the state of residency, the geographic region in which that state resides (and bordering regions for states located on the region's border), national and international. Each entry in the list will include a checkbox allowing the member to select those associations to which he or she belongs. Additionally, a text field will be associated with each entry in the list for entry of the membership number of the association. This will be a required field if the associated checkbox has been selected.

When the member has completed the form and submitted it, the background process will (1) update the member's profile to reflect agencies and associations selected, (2) extract any requirements in the External Requirements database associated with these agencies and associations and (3) search the Content Libraries for courses appropriate to satisfying these requirements. Information extracted in steps two and three is used to generate the Content Menu page.

Content Menu Page

The Content Menu page displays content titles in sections corresponding to the entities defining requirements (e.g., all content appropriate to satisfy State Board Requirements, all content appropriate to satisfy XYZ association, etc.).
- When generating the list for an association, any content provided by that association should be listed first.
- Each content entry includes the title, provider name and number of credit hours.
- Each content entry includes a checkbox. The page will provide instructions relative to the checkbox indicating that checking the box will add the content to the member's "to do" list.
- Each content title is a hyperlink to a description of the content. This will be displayed in a popup window.
- Each section contains no more than 10 titles. If more than 10 titles are available to satisfy the requirements of this section, there will be an indication of the number of titles available and a "next" hyperlink.
- Each section header includes the name of the entity that set the requirements and the total number of credit hours required. When a member selects a title (via checkbox), this header should accumulate and reflect the number of credits chosen.
- Where specific content has been specified by the requiring entity (most commonly by employers), the content entry will so signify with a graphic.

Post-processing for this page will include a "to do" list appended to the member's profile.

To Do List Page

The to do list page, generated as a result of the previous page's processing, will essentially follow the same format as the Content Menu page.
- The page will contain the content entries that the member selected on the menu page organized by requiring entity.
- The page will be formatted for printing.
- If the number of credits selected for a given entity do not add up to the number required, this fact would be noted at the end of the section for that entity.

Reminder Processing

An automated process will be developed to provide each member with an e-mail notification of the status of their "to do" list on a monthly basis. This reminder will include:
- Number of hours required by an entity.
- A list of the courses completed per requiring entity and the number of hours credited.
- A list of the courses remaining on their list and the number of hours that would be earned.

This reminder e-mail is generated whenever the member's transcript is updated.

If any employer, agency or association has indicated that it wishes similar notification of the member's progress, an e-mail will also be generated for that entity. This e-mail will only include information pertinent to that entity.

Resume Tool

The invention Resume Tool will essentially be a "wizard" application that collects information from the member, generates an HTML document and stores that document in the member's profile. The wizard will be capable of recognizing an existing resume and filling the various fields in its data collection forms. At the end of the process, the member will be provided a "Save As" option, allowing up to three versions of their resume.

Resume Data Collection

All resumes will contain the "standard" information one expects to see on a resume, divided into the appropriate sections. The data to be collected will include:
- A selection of the categories to include for this particular resume.
- Name, mailing address, e-mail address, phone number, etc.
  This information can be retrieved from the member's profile, but will be editable or excludable.
- Objective
  This optional field would be entered by the member if he/she is looking or applying for a new job.

Educational History
   This will include universities attended, degrees earned and dates.
Employment History
   This will include employers, job title, dates of employment and a free-form text field for the normal descriptive information.
Professional Organizations
   This will include organization names and, optionally, positions held.

Resume Templates

A set of standard resume templates will be developed to govern the basic layout of a resume. Each template will have optional color settings and background graphics. Template selection will be the last step in the wizard, allowing the member to view the resume, as it would appear utilizing a particular template, before making a final decision.
   Addenda Tool
   The addenda tool provides the member with a method for recording information specific to her/his profession. The information may be used as addenda to the member's resume or simply as a repository for information, the member wishes to keep track of. The addenda tool will be a form with three data elements:
   1. Title
      This text field will allow the member to title the information. If this information is to be included on their resume, this will be the section title.
   2. "Include on resume" checkbox.
   3. Free-form text box for information entry.

Permissions

For each component of the portfolio, a member will have the ability to specify who may view either the base document or information extracted from the document. Where multiple versions of document exist (transcript, resume), the member will be able to specify access for each version. The Permissions section for each document will include a list of all associations, regulatory bodies and employers with whom the member is associated and who have agreements with the entity of instant invention for reporting functions. Each entity in the list will have an associated checkbox to approve that entity for access.

Document Transfers

The member will be able to select any document in the portfolio and e-mail a copy of it to whomever they desire. Additionally, members may select one or more versions of their resume to post to the Resume Board.

Waste Basket

With the exception of To Do Lists, no documents in the portfolio have an expiration date. The waste basket will allow members to delete out-of-date or unneeded versions.
   The Setup Page is essentially a form to allow the member to identify his/her professional relationships preparatory to generating a list of appropriate content. It is a component of the CE Guidance and Portfolio Management System. This page will include a section for each professional category identified upon registration. Each section will include:
   A multi-select drop-down list of State agencies which license or certify this profession's activities. This list will include agencies in all 50 states. International versions will have varying requirements based on each country's licensing practices.
   A list of associations, organizations and societies to which a member of this profession might belong. This list will include associations in the state of residency, the geographic region in which that state resides (and bordering regions for states located on the region's border), national and international. Each entry in the list will include a checkbox allowing the member to select those associations to which he or she belongs.
   CE Reporting for License Reinstatement
   Regulating agencies have established a continued competency program to rehabilitate nurses whose competency may be compromised through the abuse of drugs or alcohol. The continued competency programs attempt to provide indication of competency, allowing disciplined practitioners to return to the practice of nursing in a manner that will benefit the public.
   The instant invention provides an Internet-based online platform allowing nurses to submit proof of competence through successful completion of courses taken via the website of the instant invention and provides readily available access by the appropriate entities to information related to specific practitioner competence.
   The practitioner, through the successful completion of appropriate online courses utilizing computer based training and nationally accredited content, will allow for streamlined submission of required competency data. State Boards of Nurses are in turn capable of communicating to the public on competency issues through the utilization of the website of the instant invention hyperlinks and posting of data.

Industry Portal for Licensed Professionals
   Professionals interested in utilizing the Internet to boost efficiency are faced with an over-abundance of data. In order for licensed professionals to take advantage of the convergence of the Internet and their respective industries, their ability to find the right services and the right information becomes a cumbersome inconclusive task.
   The website of the instant invention offers an industry specific portal for licensed professionals quick access to quality, reliable and relevant sites and services for their particular industry needs. For example, from the log in home page, subscribers can access e-mail, educational services, career information, message boards, professional resources, specialty organizations, seminar listings, discount merchandise, and guides.

Individual Member Registration
   Individual member registration is intended to provide an automated means of transferring member data online to the instant invention member database. It presumes that the individual is supplying accurate information since it may be necessary to contact individuals about special offerings and other promotions or events. The professional enters a self-defined member ID and password to initiate the registration process. The software associated with this process verifies that the member ID is unique (i.e., no one else already has that ID), responding with a "try again" message if it is not. Alternatively, the individual may choose to let the process select a member ID.
   The Instant Invention's Registration Form begins with the "standard" information; name, mailing address and phone number. The balance of the form is unique in the sense that it generates the fields required for membership based on the individual's profession. For example, medical doctors are required to enter their Social Security number. This is the standard means of identifying doctors for CE purposes since their license numbers are privileged information.

The form has been designed to minimize the amount of information required to become a member and allow quick entry into the system. Thus, when the required information has been completed, the system responds almost immediately with a welcome page and information on the member's new e-mail account. On the server of the instant invention, the background registration process has added the individual to the member database and generated the e-mail account.

Video-on-Demand

Video on Demand is a form of CE content and is available to the invention's customers in the *Continuing Education Articles* section of the site. The article title will be listed with "(Video)" following the title. Depending upon the length of the video, it may be broken into two or more segments. One difference between Video-on-Demand Continuing Education content and standard Continuing Education content is that the customer will be accessed a charge to view the video, then the testing will be at no charge. On videos with two or more segments, the segments need to be linked. Each segment will access a charge to view the video and have its own test. All videos will be generated and viewed using Windows Media Player.

Upon selecting a CE content that is in a video format, a static page will be generated as illustrated in FIG. 14.

Proceed to Video

When the customer selects "Proceed to Video", the payment screen will be displayed. After the payment type is selected, the video will be played using Windows Media Player. When the customer closes Windows Media Player, the static screen will again be displayed for the next option. Once the customer has paid to view a video, the customer may review the video at any time at no charge.

Proceed to Test

When the customer selects "Proceed to Test", the test associated with the video will be displayed. The rules for standard CE articles including testing, re-testing and application to transcript all apply here. If the customer successfully completes the testing and an additional segment (link) exists, the system will prompt "Do you wish to view the next segment of the video? (Y/N)". If "Y" is selected, create a new static page with the new information. If "N" is selected, allow the customer to select from standard routing at the bottom of the page.

Return to Articles

This option will return the customer to the listing of CE content.

Microsoft® PowerPoint© Presentations

PowerPoint is a form of CE content and will be available to the invention's customers in the Continuing Education Articles section of the site. The article title will be listed with "(PowerPoint)" following the title. Depending upon the length of the PowerPoint presentation, it may be broken into two or more segments. One difference between PowerPoint CE content and standard CE content is that the customer will be accessed a charge to view the PowerPoint presentation, then the testing will be at no charge. On PowerPoint presentations with two or more segments, the segments need to be linked. Each segment will access a charge to view the presentation and have its own test. All presentations will be generated using PowerPoint 2000 and viewed using the PowerPoint 2000 browser control.

Proceed to Presentation

When the customer selects "Proceed to Presentation", the payment screen will be displayed. After the payment type is selected, the PowerPoint presentation be displayed. When the customer closes PowerPoint 2000, the static screen will again be displayed for the next option. Once the customer has paid to view a PowerPoint Presentation, the customer may review the presentation at any time at no charge.

Proceed to Test

When the customer selects "Proceed to Test", the test associated with the PowerPoint presentation will be displayed. The rules for standard CE articles including testing, re-testing and application to transcript all apply here. If the customer successfully completes the testing and an additional segment (link) exists, the system will prompt "Do you wish to view the next segment of the PowerPoint presentation? (Y/N)". If "Y" is selected, create a new static page with the new information. If "N" is selected, allow the customer to select from standard routing at the bottom of the page.

Return to Articles

This option will return the customer to the listing of CE content.

Weekly On-line Magazine

A weekly online magazine produces articles of interest to healthcare professionals and record interviews with medical leaders and legends exclusive to our site. Other sections in our site will target sub categories; particularly nurses who represent over 70% of the medical CE market and will include: Staff Meeting, perspectives from nurse managers and support staff on important issues in their working relationship, accountability, etc.; New Frontiers, changes in nursing practice, career opportunities, licenses, nursing research; Nurse's Health, covering topics specific for the nurse and his/her health maintenance; Discussions, case examples of situations nurses face (the difficult patient) and how nursing care is managed; Skills Check, review or update on selected clinical and management skills; Issues, coverage of news items affecting nursing; Business, valuable business information tools, tips, and insight from a nurses perspective.

Online Store for Professionals

An online store provides a place where members can browse and purchase a wide variety of selected products and services from brand-name vendors. Products are selected for targeted members; for instance, Cintas Uniforms are only made available to nurses and physicians, and are not available to teachers and lawyers who are not required to have uniforms.

Wireless Communications Products

The instant invention allows members to access said system via wireless devices. Members can register for conferences or courses, view and update their transcript, download courses and tests, view and/or download articles from our online magazine and receive updates notifying members of license renew date approach and current status of requirements fulfilled.

CE Virtual Private Network

Virtual Private Network (VPN) provides the most cost effective, flexible, and secure avenue for collaboration and information exchange between the various entities in the website of the instant invention's universe. The authentication and access control features of VPN allow the instant invention to customize content delivery for all levels of CE and distance learning products and services. VPN also allows the instant invention to provide access to resources securely and expediently, and manage the data exchanges between instant invention partners such as regulatory agencies and professional organizations.

Relationships with State Regulating Entities

The instant invention offers an array of services and products that are beneficial to the regulatory agency. Reporting and tracking licensed professionals information, CE information, Professional Portfolio information and the ability to do certification, re-certification and licensure or re-licensure issue or verification to name a few. Additional services may include providing an avenue to accredit others content, have their CE content accredited, market and distribute their content. Revenue sharing or mutually beneficial exchange of services are other service options for Regulatory Agencies. Providing avenues to increase memberships and produce online media, seminars, video-on-demand, Power Point CE or conferencing are other ways in which we can provide services to a Regulatory Agency. We can provide demographic and statistical information and accurate counts of licensed professional information relevant to each profession. In short, we make what previously paper heavy, tedious processes done offline, a simple, cost effective, and convenient process online.

Automated e-Licensure/e-Certification Renewal

The instant invention provides an online processing component to track this process and is a central repository for paperless tracking and reporting of continued competency credits. Said component and attendant processing interrelationships are illustratively presented as FIG. 15. All transactions are centered on custom database and unique processing system, both of the instant invention. This service is an efficient, quick and cost effective vehicle that enables individuals and licensing agencies to save time and money by using said unique system and process to automatically renew professional licenses.

Continuous Support System of the Instant Invention

This system allows the website of the instant invention to continually monitor all methods of communication and identify trends. The information collected will be used to correct deficiencies and improve the products and services we offer. This continuous improvement is utilized to self-correct areas of deficiency, enhance operational support and improve customer relationships.

Forms Editor of the Instant Invention

The Forms Editor of the instant invention will allow our creative staff to quickly develop custom forms required by any and all professions for various reporting purposes. These forms will be based on existing hard copy forms available from requiring entities and approved for use by these entities. These forms will be available to members and will automatically complete all areas of the form where data is contained in the instant invention databases. Upon completion, the forms may be printed for mailing or transmitted electronically to the requiring entity.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

What is claimed is:

1. A computer system to facilitate the management and communications at institutional, regulatory and individual user community continuing education requirements, said system comprising:

a general purpose computer;

a central processing unit connected to said general purpose computer and having a memory that stores an institutional, regulatory and individual continuing education requirements program and information about an individual's current licensing or certifying status, employment and continuing education programs completed;

a computer software program, wherein said program adapts said central processing unit to facilitate and manage communication between said general purpose computer and a plurality of user communities comprising employers, employees and a plurality of sources of institutional, regulatory and continuing education programs and certifications, said communication addressing said communities individualized continuing education requirements such that an individual, a licensing entity, a certifying entity, an employer and a continuing education provider may modify or update data regarding an individual; and, wherein said adapted central processing unit's facilitation and management of communication comprises:

(a) identifying and managing employer identified relationships and associated continuing education requirements;

(b) identifying and managing continuing education content provider and associated continuing education requirements;

(c) identifying and managing continuing education accrediting agency identified relationships and associated continuing education requirements;

(d) identifying and managing professional association identified relationships and associated continuing education requirements;

(e) identifying and managing individual professional identified relationships and associated continuing education requirements;

(f) identifying and managing regulatory agency identified relationships and associated continuing education requirements;

(g) identifying and managing business entity identified relationships and associated continuing education requirements;

(h) identifying and facilitating administrative support and database maintenance functions;

(i) updating said memory to reflect completion of additional continuing education requirements and additional certifications of the individual by means of addition of such information directly from an associated continuing education provider without providing the associated continuing education provider access to the information in the memory, and (j) verifying the additional continuing education requirements and additional certifications of the individual by contacting the associated continuing education provider.

2. The system of claim 1 wherein said general purpose computer further comprises a video display and input device, said video display and input device configured to facilitate user interaction with said central processing unit.

3. The system of claim 1 further comprising at least one database communicably attached to said general purpose computer.

* * * * *